United States Patent
Monajemi et al.

(10) Patent No.: US 9,249,881 B1
(45) Date of Patent: Feb. 2, 2016

(54) POWER DOWNSHIFT CLUTCH CONTROL (71) Applicant: GM GLOBAL TECHNOLOGY OPERATIONS LLC, Detroit, MI (US)

(72) Inventors: Dara Monajemi, Lansing, MI (US); Jeremy V. Horgan, Northville, MI (US); Matthew Pruski, Brighton, MI (US); Brian H. Fiore, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/628,859

(22) Filed: Feb. 23, 2015

(51) Int. Cl.
| | |
|---|---|
| *F16H 61/04* | (2006.01) |
| *F16H 61/686* | (2006.01) |
| *F16H 59/70* | (2006.01) |
| *F16H 61/06* | (2006.01) |

(52) U.S. Cl.
CPC .............. *F16H 61/686* (2013.01); *F16H 59/70* (2013.01); *F16H 61/04* (2013.01); *F16H 61/061* (2013.01); *F16H 2061/0444* (2013.01); *F16H 2061/0455* (2013.01); *F16H 2061/0462* (2013.01); *F16H 2306/20* (2013.01); *F16H 2306/24* (2013.01)

(58) Field of Classification Search
None
See application file for complete search history.

(56) References Cited

U.S. PATENT DOCUMENTS

| | | | |
|---|---|---|---|
| 2004/0242371 A1* | 12/2004 | Saitou | F16H 61/08 477/70 |
| 2006/0195243 A1* | 8/2006 | Suzuki | F16H 61/0437 701/51 |

* cited by examiner

*Primary Examiner* — Erin D Bishop
(74) *Attorney, Agent, or Firm* — Quinn Law Group, PLLC (57) ABSTRACT

A method of controlling clutches in a multi-speed transmission includes beginning a current shift from a starting gear to an initial target gear, and determining whether the current shift is a downshift. The method determines jump-stage eligibility of a first clutch. Determining jump-stage eligibility includes determining whether the first clutch is a holding clutch for the current shift, and determining whether the first clutch is an off-going clutch for a legal shift from the initial starting gear to an adjusted target gear having a higher speed ratio than the initial starting gear. If the first clutch is not jump-stage eligible, the method maintains pressure of the first clutch at a current pressure. If the first clutch is jump-stage eligible, the method reduces the pressure of the first clutch from the current pressure to a staging pressure, which is greater than a slipping pressure.

13 Claims, 7 Drawing Sheets

|     | GEAR 1 | GEAR 2 | GEAR 3 | GEAR 4 | GEAR 5 | GEAR 6 | GEAR 7 | GEAR 8 | GEAR 9 |
|-----|--------|--------|--------|--------|--------|--------|--------|--------|--------|
| C1  | x      | x      | x      | x      | x      | x      |        |        |        |
| C2  |        | x      |        |        |        |        |        |        |        |
| C3  |        |        | x      |        |        |        |        |        |        |
| C4  |        |        |        | x      |        |        |        |        |        |
| C5  |        |        |        |        | x      |        | x      |        | x      |
| C6  |        |        |        |        |        | x      | x      | x      | x      |
| C7  | x      |        |        |        |        |        |        | x      |        |

FIG. 4

|     | GEAR 1 | GEAR 2 | GEAR 3 | GEAR 4 | GEAR 5 | GEAR 6 | GEAR 7 | GEAR 8 | GEAR 9 | GEAR 10 |
|-----|--------|--------|--------|--------|--------|--------|--------|--------|--------|---------|
| C1  | x      | x      | x      | x      | x      | x      |        |        |        |         |
| C2  | x      | x      | x      | x      | x      |        |        |        |        |         |
| C3  | x      | x      |        | x      | x      | x      | x      |        |        |         |
| C4  | x      | x      | x      | x      |        | x      | x      | x      |        |         |
| C5  |        |        |        |        | x      | x      | x      | x      | x      | x       |
| C6  |        |        |        |        |        |        | x      | x      | x      | x       |

POWER DOWNSHIFT CLUTCH CONTROL

TECHNICAL FIELD

This disclosure relates to controls for, and methods of operating, transmissions having a plurality of clutches and a plurality speed ratios.

BACKGROUND

An automatic transmission may include a plurality of torque-transmitting mechanisms, such as clutches and brakes. Some of the torque-transmitting mechanisms may be selectively engageable to choose the speed ratio or operating mode of the transmission. The transmission may shift between different speed ratios based upon operating conditions of the powertrain into which the transmission is incorporated.

SUMMARY

A method of controlling clutches in a multi-speed transmission is provided. The method includes beginning a current shift, which changes the transmission from a starting gear to an initial target gear, and determining whether the current shift is a downshift, which occurs if the initial target gear has a higher speed ratio than the initial starting gear.

The method determines a jump-stage eligibility of at least a first clutch. Determining jump-stage eligibility includes determining whether the first clutch is a holding clutch for the current shift, and determining whether the first clutch is an off-going clutch for a legal shift from the initial starting gear to an adjusted target gear, which also has a higher speed ratio than the initial starting gear.

If the first clutch is not jump-stage eligible, the method maintains pressure of the first clutch at a current pressure. If the first clutch is jump-stage eligible, the method reduces the pressure of the first clutch from the current pressure to a staging pressure, which is greater than a slipping pressure for the first clutch.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
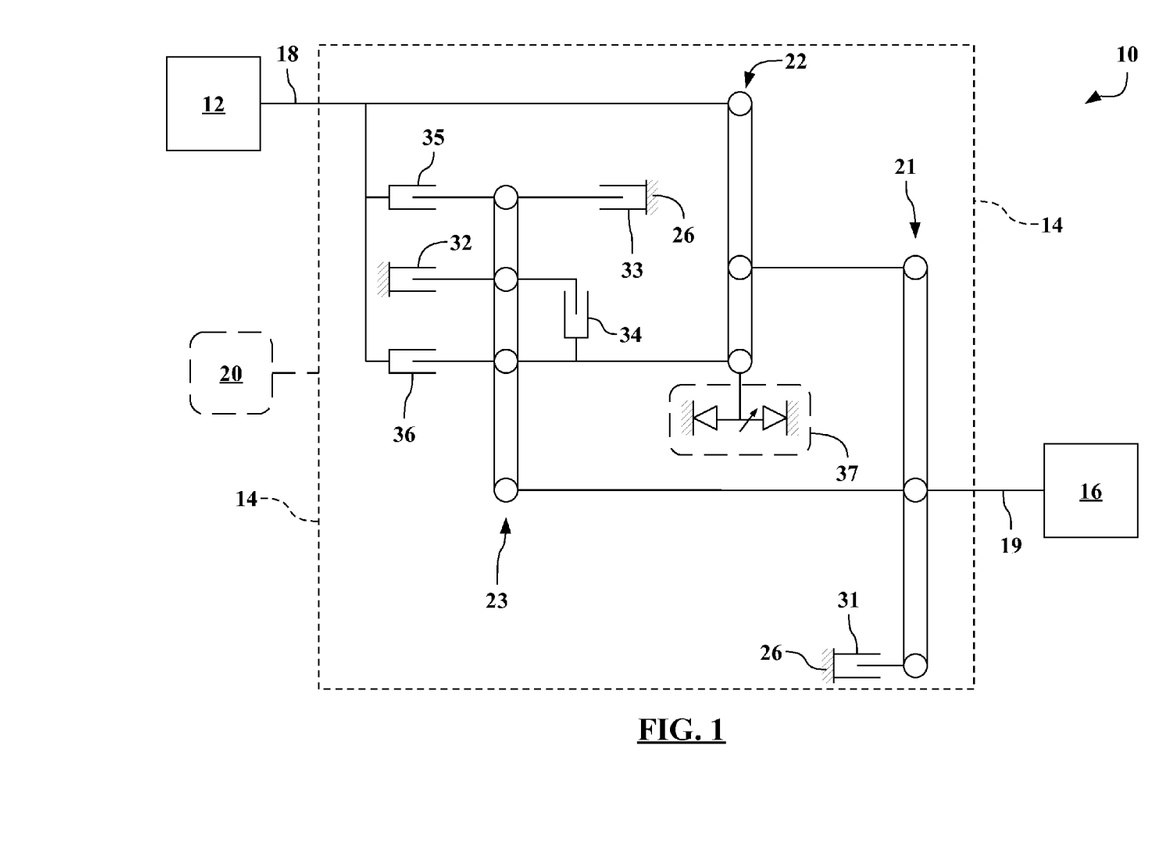
FIG. 1 is a schematic, diagrammatic view of a powertrain having a transmission, which is shown as a lever diagram.

Referring to the drawings, wherein like reference numbers correspond to like or similar components whenever possible throughout the several figures, there is shown in FIG. 1 an illustrative powertrain system, designated generally as powertrain 10, for numerous types of vehicles (not shown). The powertrain 10 includes an internal combustion engine 12 drivingly connected to a transmission 14. The transmission 14 is a multi-speed, fixed-gear transmission, and is in powerflow communication with a final drive system 16. The transmission 14 may be referred to as an automatic transmission, as contrasted with a manual transmission having a foot-operated clutch that disconnects the engine 12 from the transmission 14. Components shown and described in relation to one of the figures may be applied to, or combined with, components shown and described in any of the other figures.

In FIG. 1, the transmission 14 is shown as a lever diagram. A lever diagram is a schematic representation of the components of a mechanical device, such as an automatic transmission. Each individual lever represents a planetary gear set, wherein the three basic mechanical components of the planetary gear set are each represented by a node. Therefore, a single lever contains at least three nodes: one for the sun gear member, one for the planet gear carrier member, and one for the ring gear member. Compounded planetary gear sets may be represented by four-node levers.

The relative length between the nodes of each lever may be used to represent the ratio of each respective gear set. These lever ratios, in turn, are used to vary the speed ratio of the transmission in order to achieve appropriate ratios and ratio progression.

In the lever diagram, mechanical couplings or interconnections between the nodes of the various planetary gear sets and other components of the transmission are illustrated by thin lines. Torque-transmitting mechanisms or torque-transfer devices, such as clutches and brakes, may be presented as interleaved fingers. If the mechanism is a brake, one set of the fingers is grounded. If the mechanism is a one-way clutch the couple is free to move away from, but not into, the ground.

The final drive system 16 may include a front or rear differential, or other torque-transmitting mechanism, which provides torque output to one or more wheels (not shown) through respective vehicular axles or half-shafts (not shown). The wheels may be either front or rear wheels of the vehicle on which they are employed, or they may be a drive gear of a track vehicle. Those having ordinary skill in the art will recognize that the final drive system 16 may include any known configuration, including front-wheel drive (FWD), rear-wheel drive (RWD), four-wheel drive (4WD), or all-wheel drive (AWD), without altering the scope of the disclosed methods and structures.

While the systems may be described with respect to automotive or vehicular applications, those skilled in the art will recognize broader applicability. Those having ordinary skill in the art will recognize that terms such as "above," "below," "upward," "downward," et cetera, are used descriptively of the figures, and do not represent limitations. Any numerical designations, such as "first" or "second" are illustrative only and are not intended to be limiting.

The transmission 14 is designed to receive at least a portion of its driving power from the engine 12 via an input member 18. The transmission input member 18 may be the engine output shaft (also referred to as a crankshaft). The powertrain 10 may include another primary mover, such as an electric machine (not shown), operatively attached to the input member 18 and the output member 19. The electric machine may add or remove power or torque from the input member 18. The powertrain 10 may also include a torque converter (not shown) disposed between the engine 12 and the transmission 14.

The input member 18 transfers power to the transmission 14, which distributes power and torque through the output member 19 to the final drive system 16 to propel the vehicle (not shown). A battery (not shown) acts as an energy storage device for the powertrain 10 and the vehicle and may be a chemical battery, battery pack, or another energy storage device recognizable to those having ordinary skill in the art.

The illustrative transmission 14 shown in FIG. 1 is a nine-speed automatic transmission, i.e., there are nine forward speed ratios of operation between the input member 18 and the output member 19. The methods, processes, and techniques described herein may be applied to transmissions with fewer speed ratios (such as eight or six speeds) or with additional speed ratios (such as ten or more speeds).

As used herein, speed ratio may be used interchangeably with torque ratio, torque multiplication, or gear ratio. Specific speed ratios of the transmission 14 may be referred to as specific modes or specific gears, such as Gear 1, Gear 2, etc.; or may be referred to as named gears, such as starting gear, initial target gear, adjusted target gear, etc. These gears refer to modes of operation in which specific speed ratios are active for the transmission 14, usually through selective actuation of torque-transmitting mechanisms, as explained herein.

The powertrain 10 and the transmission 14 may be in communication with a control system or controller 20. Execution of shifts between different speed ratios of the transmission 14 may occur in response to commands from the controller 20, which may work in concert and communication with other control systems. The controller 20 may primarily control the transmission 14 or may be part of a larger control system or control module, such as a powertrain control module (PCM) or an engine control unit (ECU).

The transmission 14 utilizes one or more differential gear arrangements, such as epicyclic planetary gear sets: a first planetary gear set 21 (P1), a second planetary gear set 22 (P2), and a third planetary gear set 23 (P3/4). The first planetary gear set 21, second planetary gear set 22, and third planetary gear set 23 each include a plurality of gear members (not separately numbered).

In referring to the first, second and third planetary gear sets 21, 22, 23 these sets may be denoted "first" to "third" in any order in the drawings (e.g., left to right, right to left, or varied). Similarly, individual elements of the first, second and third planetary gear sets 21, 22, 23 may be denoted "first" to "third" or "fourth" in any order in the drawings (e.g., top to bottom, or varied).

The transmission 14 includes seven torque-transmitting mechanisms, which may simply be referred to as clutches. In the illustrative embodiment depicted in FIG. 1, the torque-transmitting mechanisms include friction clutches, brakes, and one-way clutches. However, other clutch configurations may be employed, such as dog clutches, rocker clutches, and others recognizable to those having ordinary skill in the art. The clutches are hydraulically actuated, receiving pressurized hydraulic fluid from a pump (not shown). Torque-transmitting mechanisms acting as brakes may be selectively connected to a static or ground element of the powertrain 10, such as a transmission case or housing 26 of the transmission 14.

The rotating components of transmission 14 may be coaxially oriented about a central axis, which may be coaxial with the input member 18, the output member 19, or both. Various shafts, sleeve shafts, belts, gears, or similar connecting members may connect the components of the transmission 14. For illustrative purposes, the torque-transmitting mechanisms may also be named according to the gears or modes for which each is engaged, as shown herein. Specific interconnections between the elements of the first, second and third planetary gear sets 21, 22, 23 are apparent to those having ordinary skill in the art and are not discussed in detail herein.

Figure 2:
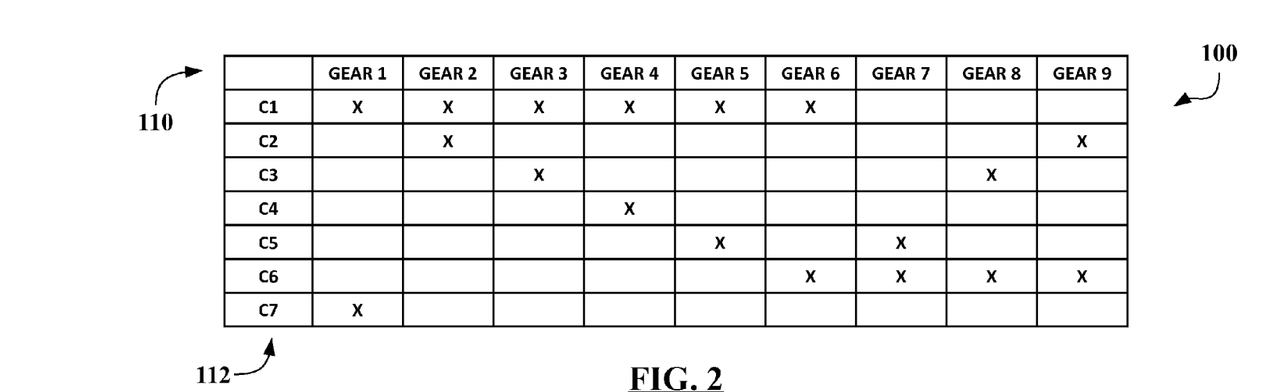
FIG. 2 is a schematic chart or table illustrating clutch engagement for the forward gears of the transmission shown and described in FIG. 1.

Referring now to FIG. 2, and with continued reference to FIG. 1, there is shown a schematic chart or table 100 of the states for placing the transmission 14 of the powertrain 10 shown in FIG. 1 into nine forward speed ratios (which may be referred to as first through ninth gears; or as Gear 1, Gear 2, Gear 3, etc.). A horizontal row 110 shows the gear number and a vertical column 112 shows the clutch number. In table 100, selective engagement of the clutches is represented by an "X" in the chart. In the case of the one-way clutches, engagement refers to rotation against the one-way clutch—such that the clutch is effectively locked or engaged and is acting as a brake. The table 100 does not illustrate reverse or neutral states.

A first clutch 31 (C1), which may be interchangeably referred to as clutch CB123456, is a brake clutch that selectively grounds to the housing 26. A second clutch 32 (C2), which may be interchangeably referred to as clutch CB29, is a brake clutch. A third clutch 33 (C3), which may be interchangeably referred to as clutch CB38, is also a brake clutch.

A fourth clutch 34 (C4) may be interchangeably referred to as clutch C4. A fifth clutch 35 (C5) may be interchangeably referred to as clutch C57R. A sixth clutch 36 (C6) may be interchangeably referred to as clutch C6789.

A seventh clutch 37 (C7) may be interchangeably referred to as clutch CB1R. The seventh clutch 37 is a selectable one-way clutch that is changeable between operating as a one-way clutch in either of two directions to allow forward or reverse operation of the transmission 14. Because the table 100 shows only forward operation, the seventh clutch 37 is only shown as engaged (i.e., reacting against the one-way barrier) in one mode.

The exact connections between elements of the transmission 14 shown in FIG. 1 and FIG. 2 are not limiting. The methods, processes, and techniques described herein may be applied to transmissions with different configurations. The seven clutches are denoted C1, C2, C3, C4, C5, C6, and C7 in the table 100, but may alternatively be identified by element number alone.

From table 100, the clutch transitions for any shifts between forward speed ratios may be determined. Shifting from one forward speed ratio to another is achieved by disengaging one or more engaged clutches, referred to as off-going clutches, while engaging one or more disengaged clutches, referred to as on-coming clutches. Clutches which remain engaged throughout the shift are referred to as holding clutches.

For example, to downshift from Gear 6 to Gear 2, the off-going clutch is the sixth clutch 36 (C6789), the on-coming clutch is the second clutch 32 (CB29), and the first clutch 31 (CB123456) is the holding clutch. For a downshift, the off-going clutch controls the speed ratio transition, such that slipping of the off-going clutch begins transfer to the new speed ratio. To upshift from Gear 7 to Gear 8, the off-going clutch is the fifth clutch 35 (C57R), the on-coming clutch is the third clutch 33 (CB38), and the sixth clutch 36 (C6789) is the holding clutch. For an upshift, the on-coming clutch controls the speed ratio transition, such that slipping the oncoming clutch begins transfer to the new speed ratio.

As illustrated in the table 100, shifts between adjacent gears or speeds generally involve one off-going clutch and one on-coming clutch. However, other transmission configurations may involve shifts having more or fewer on-coming or off-going clutches.

Full engagement of any of the clutches refers to substantially complete torque transfer across the clutch, such that the input torque and output torque across the clutch is substantially equal and elements connected by the clutch rotate at substantially equal speed. Slipping engagement refers to partial engagement and partial torque transfer across the clutch, such that elements connected by the clutch do not rotate at substantially equal speed. An open, or disengaged, clutch is one that is not transferring torque between any of the elements joined by the clutch, such that the elements are free to rotate independently of each other.

Figure 3A:
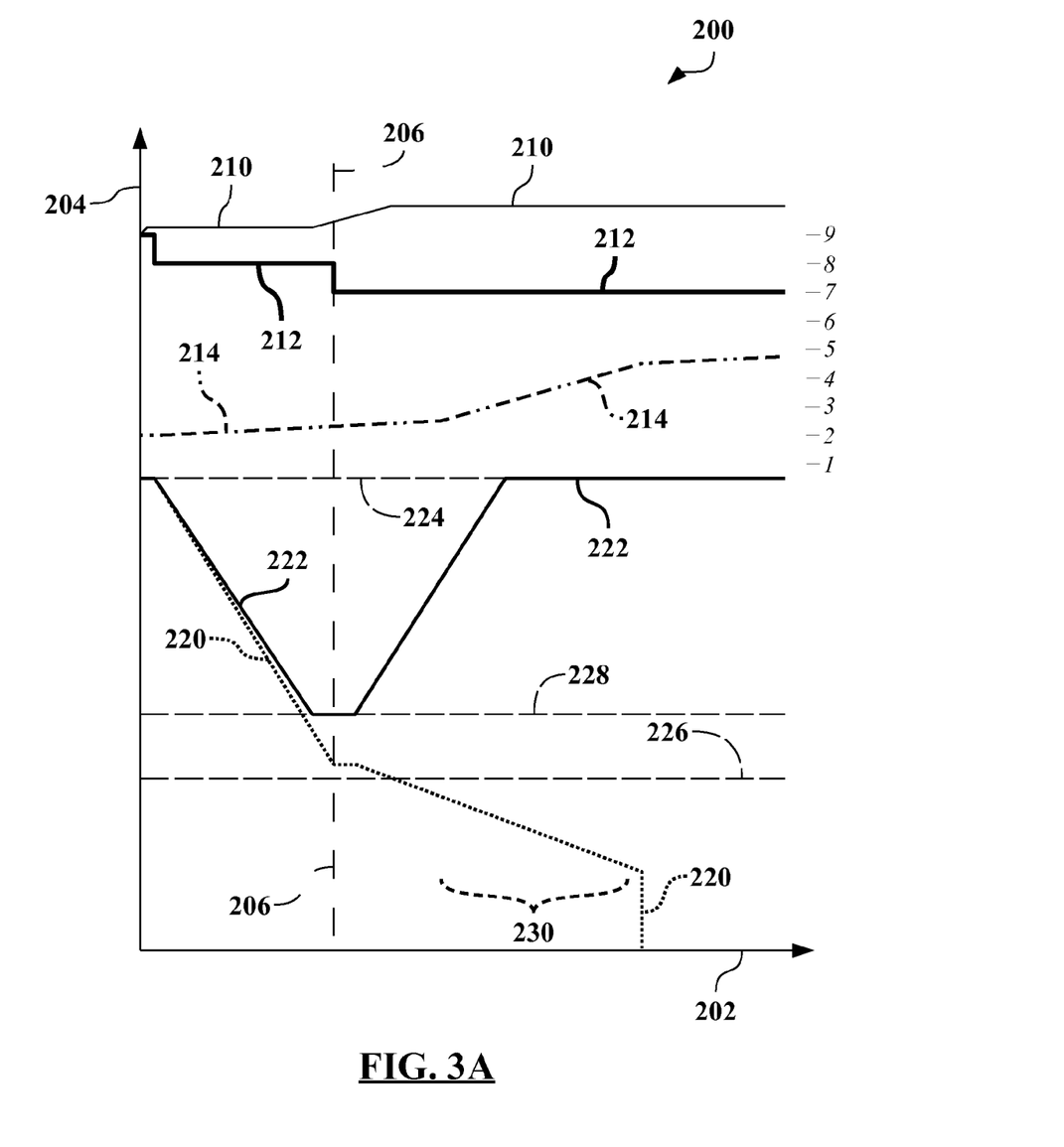
FIG. 3A is a schematic chart illustrating a shift maneuver for the transmission shown and described in FIG. 1 and FIG. 2.
Figure 3B:
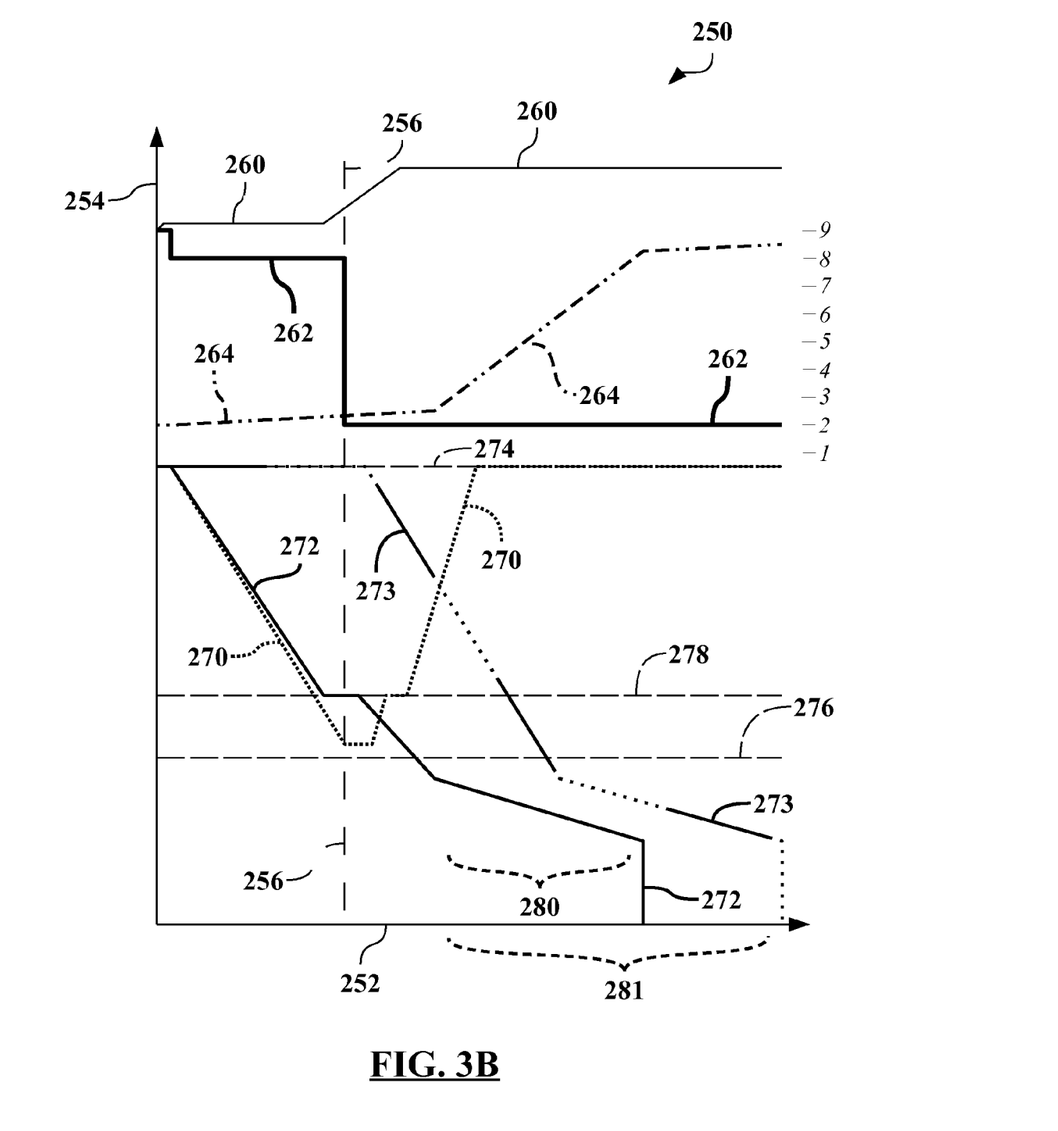
FIG. 3B is a schematic chart of illustrating another shift maneuver for the transmission shown and described in FIG. 1 and FIG. 2.

Referring now to FIG. 3A and to FIG. 3B, and with continued reference to FIGS. 1 and 2, there are shown two schematic charts illustrating multi-gear downshifts or change-of-mind downshifts for the transmission 14 or other transmissions having fluid-actuated clutches.

FIG. 3A shows a schematic chart 200 illustrating a shift maneuver transitioning from a current shift or initial shift to a first adjusted shift. FIG. 3B shows a schematic chart 250 illustrating a shift maneuver transitioning from an initial shift to a second adjusted shift.

In both the chart 200 and the chart 250, the initial shift is a power-on or power downshift (PD) from Gear 9 to Gear 8 (therefore, that shift may be abbreviated as 9-8 PD). Furthermore, in both the chart 200 and the chart 250, a change-of-mind occurs that requires a further downshift after the initial shift began. The change-of-mind may be caused by an additional torque request from the driver or powertrain controller, such as the cruise control.

The shift maneuvers illustrated in the chart 200 and the chart 250 are described with the components of the powertrain 10 and the transmission 14. However, other powertrain and transmission configurations may be used to execute the shift maneuver and may have similar illustrative charts.

The chart 200 shows the transmission 14 during a single shift maneuver that includes at least one change to the final gear. The initial shift is a power downshift (PD) from Gear 9 to Gear 8 (therefore, that shift may be abbreviated as 9-8 PD) and the first adjusted shift is a power downshift from Gear 9 to Gear 7 (therefore, that shift may be abbreviated as 9-7 PD). Contrarily, the second adjusted shift, illustrated by the chart 250 in FIG. 3B, changes from the initial downshift (9-8 PD) to a power jump downshift (PD_JD) from Gear 9 to Gear 2 (therefore, that shift may be abbreviated as 9-2 PD_JD).

Generally, power shifts occur when an accelerator pedal (not shown) is depressed and the driver is requesting torque, or when the throttle is being actuated by the controller 20 to request torque. Power-off shifts occur during times of lesser torque requests. Power-on shifts often occur during times of acceleration and may require more-precise control over the elements of the transmission 14 in order to provide more-pleasing driving feel.

The chart 200 includes an x-axis 202, which illustrates time from left to right, and a y-axis 204, which represents different values depending upon the individual characteristics being shown. The y-axis 204 may represent speed ratio, fluid pressure, torque, rotational speed, or acceleration. A marker 206 is used to help identify the general location or time of the change-of-mind event occurring during the maneuver.

A torque request 210 illustrates the relative amount of torque being requested of the transmission 14. The torque request 210 may be derived from the throttle, which may be controlled by the accelerator pedal input by the driver or may be derived from other systems, including (but not limited to) cruise control and traction control systems. Relative to the y-axis 204, the toque request 210 moves upward with increasing torque. The scale of the torque request 210 may vary greatly depending upon the type of vehicle (such as small cars versus semi-tractors).

A commanded gear 212 shows the gear sought by the transmission 14. The commanded gear 212 shows the mode (i.e., specific speed ratio) in which the controller 20 is commanding operation. Illustrative mode numbers are shown along the upper right side of the chart 200. For example, when the driver requests significantly more acceleration by further depressing the accelerator pedal, it may be an indication that the transmission 14 should downshift into a lower gear to better accelerate the vehicle.

During the maneuver illustrated in chart 200, the initial shift is intended to change the transmission 14 from a starting gear, which is Gear 9, to an initial target gear, which is Gear 8. However, before completing that power downshift, the maneuver then seamlessly changes to an adjusted shift, which is a downshift to an adjusted target gear, Gear 7.

The change from the initial shift to the adjusted shift generally occurs at the marker 206. To begin executing the adjusted shift, the controller 20 changes the commanded gear 212 from Gear 8 (the initial target gear) to Gear 7 (the adjusted target gear). Relative to the y-axis 204, the speed ratio of the transmission 14 decreases in the upward direction; therefore, the gear number increases in the upward direction.

The commanded gear 212 may be determined by the controller 20 from analysis of the operating conditions of the powertrain 10 in light of the torque request 210. For example, the increasing torque request 210 suggests that the transmission 14 should operate with a higher speed ratio and that a downshift (such as from Gear 9 to Gear 8) is beneficial. However, because the torque request 210 increases before the transmission begins the shift from Gear 9 to Gear 8, the transmission 14 commands operation in Gear 7, as shown by the commanded gear 212.

The chart 200 also includes an input speed 214, which illustrates the relative rotational speed (Ni) of the input member 18 for the transmission 14. Depending upon the configuration of the powertrain 10, the input speed 214 may be equivalent to the speed of the engine 12, to the speed of a turbine of a torque converter, or to other input devices to the transmission 14.

The input speed 214 is positive in the upward direction of the y-axis 204. As the transmission 14 executes the downshift, the input speed 214 generally increases to maintain smooth output speeds (not shown).

The chart 200 illustrates relative pressures of some of the clutches used to place the transmission 14 into the respective speed ratios involved with the shift maneuvers described. An initial off-going pressure 220 illustrates pressure control over the off-going clutch for the initial shift. The off-going clutch for the 9-8 initial downshift is, as shown in table 100, the second clutch 32. Note that the pressures illustrated schematically in the charts may be either commanded pressures (those sought by the controller 20) or actual pressures (those actually being experienced within the clutches, which may lag behind the commanded pressures).

An eligible holding pressure 222 illustrates pressure control over an eligible holding clutch during the initial shift. The 9-8 initial downshift includes only one holding clutch, the sixth clutch 36, as shown in table 100.

Eligible holding clutches, or jump-stage eligible clutches, are holding clutches for the initial shift that are also off-going clutches for other legal downshifts from the starting gear. In many transmission configurations, legal shifts are those that include only one off-going clutch and only one on-coming clutch. However, other configurations may exist. In any downshift, while the holding clutches are expected to be engaged throughout the downshift, those holding clutches may also be off-going clutches for a different downshift from the starting gear. Such holding clutches may be used to execute a power jump downshift.

As shown in table 100, during the 9-8 initial downshift, the holding clutch is the sixth clutch 36. However, the sixth clutch 36 is also the off-going clutch for a 9-2 downshift, such that the sixth clutch 36 is an eligible holding clutch.

The chart 200 schematically illustrates several pressure levels at which changes in torque-transmitting capability of clutches within the transmission 14 occur. A full level or max level 224 illustrates the fluid pressure at which engaged clutches may be held to maintain engagement. A slipping level 226 illustrates the pressure below which engaged clutches begin slipping, such that they are no longer transferring complete torque. A staging level 228 schematically illustrates a fluid pressure above the slipping level, such that clutches at the staging level 228 are engaged but are relatively close to slipping.

Note that the pressure levels are illustrated in the figures as being the same for all of the clutches, and as being consistent (flat). However, different clutches may have different relative pressure levels depending upon many factors, including but not limited to: clutch type, operating mode, and the amount of torque being transferred by the clutch.

Furthermore, the max level 224, the slipping level 226, and the staging level 228 may also be changing with time, such that the levels illustrated in the chart 200 may not be flat. These levels vary based on engine torque, lever ratio, turbine inertia, etc. For illustrative purposes, the chart 200 (and the chart 250) illustrates these key pressure levels schematically as flat lines, and the relationships between the pressure levels and the pressure signals and commands for the clutches as relative levels.

As shown in FIG. 3A, during the initial shift, the torque request 210 is sufficient for the controller 20 to command the 9-8 downshift, as shown by the commanded gear 212. To execute the 9-8 downshift, the off-going pressure 220 begins decreasing from the max level 224 toward the slipping level 226. Also at substantially the beginning of the initial shift, the eligible holding pressure 222 also begins decreasing toward the staging level 228. Once the eligible holding pressure 222 reaches the staging level 228, it will be maintained, such that the holding clutch could quickly be moved into slipping engagement, below the slipping level 226, if needed.

An increase in the torque request 210, occurring at about the marker 206, causes the commanded gear 212 to move from Gear 8 (the initial target gear) to Gear 7 (the adjusted target gear). Note that the initial shift has not begun changing speed ratio because the initial off-going pressure 220 has not reached the slipping level 226, at which point the ratio change generally begins. Therefore, not only has the initial shift not completed, but has barely begun.

The adjusted shift is a 9-7 power downshift, and the controller 20 immediately switches to executing the adjusted shift (9-7 PD) instead of the initial shift (9-8 PD). The second clutch 32 is still the off-going clutch for the adjusted shift, such that the initial off-going pressure 220 continues to move toward the slipping level 226. Additionally, the sixth clutch 36 is still an eligible holding clutch for the adjusted shift, such that the eligible holding pressure 222 is maintained at the staging level 228.

Once slipping disengagement of the off-going clutch begins, the initial shift has moved beyond the point of executing the power jump downshift with the eligible holding clutch. Therefore, the eligible holding pressure 222 returns to the max pressure 224 as a continued holding clutch for the 9-7 downshift. Note that FIG. 3A shows the same result for the eligible holding pressure 222 as would occur if the initial shift had simply completed. Furthermore, note that the eligible holding pressure 222 may be maintained at the staging pressure until the 9-7 downshift begins the ratio change as the off-going clutch for the adjusted shift begins the slip. This is because, even though the initial shift has been changed to the adjusted shift, the sixth clutch 36 is still an eligible holding clutch a further change-of-mind jump downshift.

As the adjusted shift completes, the initial off-going pressure 220 continues to decrease as an on-coming clutch (the fifth clutch 35, the pressure of which is not shown) engages and begins transferring torque. After the on-coming clutch fully engages, the initial off-going pressure 220 is exhausted. A slipping period or speed ratio change 230 roughly illustrates an approximate time to complete the adjusted shift as speed ratio actually changes. After the speed ratio change 230 is complete, the input speed 214 is generally at the proper level for the adjusted target gear and is no longer ramping upward.

FIG. 3A illustrates a change-of-mind power downshift in which the eligible holding clutch (the sixth clutch 36) was staged for possible use as an off-going clutch. However, because the adjusted shift did not utilize the eligible holding clutch as an off-going clutch, the eligible holding pressure 222 returned to the max level 224. Contrarily, FIG. 3B illustrates a change-of-mind power downshift in which the eligible holding clutch (the sixth clutch 36) is utilized as an off-going clutch for the adjusted shift.

FIG. 3B illustrates generally the same signals and commands as FIG. 3A. The chart 250 includes an x-axis 252 and a y-axis 254. A marker 256 is used to help identify the general location or time of the change-of-mind event occurring during the maneuver. A torque request 260 illustrates the relative amount of torque being requested of the transmission 14, such as by the controller 20, and an input speed 264 shows the rotational speed at the input member 18.

As shown in FIG. 3B, the torque request 260 increases, which causes a change to a commanded gear 262. During the maneuver illustrated in chart 250, the initial shift is intended to change the transmission 14 from a starting gear, which is Gear 9, to an initial target gear, which is Gear 8. Note that the initial shift of chart 250 is substantially identical to the initial shift of chart 200. However, before completing that power downshift, the maneuver then seamlessly changes to an adjusted shift, which is a downshift to an adjusted target gear, Gear 2. The lower commanded gear may be the result of a greater increase to the torque request 260.

The change from the initial shift to the adjusted shift generally occurs at the marker 256. To begin executing the adjusted shift, the controller 20 changes the commanded gear 262 from Gear 8 (the initial target gear) to Gear 2 (the adjusted target gear). The controller 20 is now executing a power jump downshift from Gear 9 to Gear 2 (9-2 PD_JD).

An initial off-going pressure 270 illustrates pressure control over the off-going clutch for the initial shift. The off-going clutch for the 9-8 initial downshift is, as shown in table 100, the second clutch 32. An eligible holding pressure 272 illustrates pressure control over an eligible holding clutch during the initial shift. As shown in table 100, during the 9-8 initial downshift, the holding clutch is the sixth clutch 36. However, the sixth clutch 36 is also the off-going clutch for a 9-2 downshift, such that the sixth clutch 36 is an eligible holding clutch or a jump-stage eligible clutch.

The chart 250 schematically illustrates several pressure levels, including a max level 274, a slipping level 276, and a staging level 278.

As shown in the chart 250, during the initial shift, the torque request 260 is sufficient for the controller 20 to command the 9-8 downshift and the off-going pressure 270 begins decreasing from the full level 274 toward the slipping level 276. At, or near, the beginning of the initial shift, the eligible holding pressure 272 also begins decreasing toward the staging level 278. Once the eligible holding pressure 272 reaches the staging level 278, it will be maintained, such that the holding clutch could quickly be moved into slipping engagement, below the slipping level 276, if needed, or could be returned to the max level 274, if staging is no longer needed.

The increase in the torque request 260, occurring at about the marker 256, causes the commanded gear 262 to move from Gear 8 (the initial target gear) to Gear 2 (the adjusted target gear). Note that the initial shift has not begun changing speed ratio because the initial off-going pressure 270 has not reached the slipping level 276, at which point the speed ratio change would generally have begun.

The adjusted shift is a 9-2 power jump downshift, and the controller 20 immediately switches to executing the adjusted shift (9-2 PD_JD) instead of the initial shift (9-8 PD). The second clutch 32 is no longer the off-going clutch for the adjusted shift, such that the initial off-going pressure 270 moves away from the slipping level 276.

The sixth clutch 36 is not a holding clutch for the adjusted shift, but is now the off-going clutch for the adjusted shift. Therefore, the eligible holding pressure 272 begins decreasing toward the slipping level 276 to begin disengaging the sixth clutch 36. For the 9-2 PD_JD, the on-coming clutch is the first clutch 31, as shown in table 100.

Note that the second clutch 32, which was the off-going clutch for the initial shift, is now a holding clutch for the adjusted shift. Therefore, until the 9-2 PD_JD begins to change speed ratios, the second clutch 32 is also a jump-stage eligible holding clutch, such that its pressure (still illustrated on the line for the initial off-going pressure 270 may hold at the staging level 278 until the adjust shift begins).

The chart 250 also shows a non-staged holding clutch pressure 273, which illustrates the approximate pressure control for the sixth clutch 36, if the methods described herein had not staged the sixth clutch 36 during the initial shift. As shown by non-staged holding clutch pressure 273, the pressure of the sixth clutch 36 must be decreased from the max level 274 after the controller 20 changes the commanded gear 262 to the adjusted gear, Gear 2. Therefore, the non-staged holding clutch pressure 273 must make a larger change in pressure before it reaches the slipping level 276 and the adjusted shift can begin.

Comparison of the eligible holding pressure 272 and the non-staged holding clutch pressure 273 lines illustrates a relative delay in bringing the sixth clutch 36 down to slipping pressure after the change-of-mind the adjusted shift. If the controller 20 had not determined that the sixth clutch 36 was a jump-stage eligible clutch and reduced its pressure during the initial shift, the adjusted shift would have taken longer to begin.

As the adjusted shift illustrated in chart 250 is executed, the eligible holding pressure 272 decreases for slipping disengagement and the on-coming clutch (not shown) increases for slipping engagement. A speed ratio change 280 shows the approximate duration of the hand-over between clutches to effect the adjusted shift. A non-staged change period 281 illustrates the approximate relative duration of the adjusted shift without staging of the jump-stage eligible clutch. Because the eligible holding pressure 272 was already lowered to the staging level 278, the sixth clutch 36 was able to begin slipping disengagement more quickly than it would have if it had been at the max level 274, such that the control scheme illustrated herein improved shift time for the adjusted shift. The difference between the non-stage change period 281 and the speed ratio change 280 illustrates the relative improvement in shift-execution speed resulting from the method of staging eligible holding clutches described herein.

Comparison between FIGS. 3A and 3B shows that the eligible holding pressure (222 or 272) is decreased in anticipation of possible use as an off-going clutch for an adjusted shift. Note that this pressure control occurs irrespective of actual execution of a jump downshift that utilizes the staged holding clutch.

Figure 4:
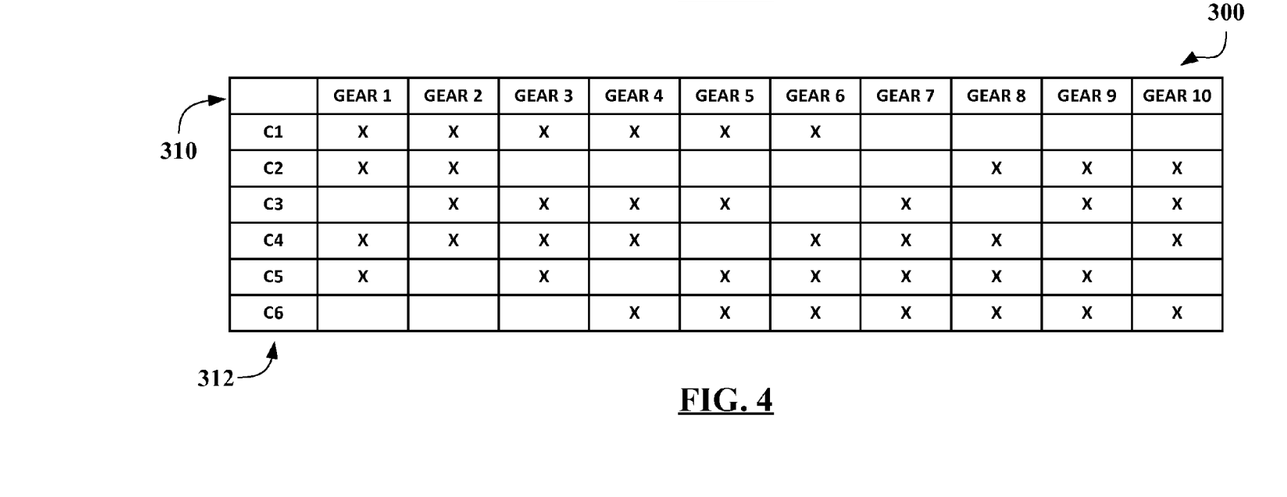
FIG. 4 is a schematic chart or table illustrating clutch engagement for the forward gears of a ten-speed transmission.

Referring now to FIG. 4, and with continued reference to FIGS. 1-3B, there is shown a schematic chart or table 300 of clutch engagement states for a ten-speed transmission, the lever diagram of which is not shown. The ten-speed transmission has six torque-transmitting members or clutches that engage and disengage to select one of ten forward speed ratios (which may be referred to as first through tenth gears; or as Gear 1, Gear 2, Gear 3, etc.).

A horizontal row 310 shows the gear number and a vertical column 312 shows the clutch number. The six clutches are denoted C1, C2, C3, C4, C5, and C6 in the table 300, but may alternatively be identified by number alone. In table 300, selective engagement of the clutches is represented by an "X" in the chart. In the case of the one-way clutches, engagement refers to rotation against the one-way clutch—such that the clutch is effectively locked or engaged and is acting as a brake. The table 300 does not illustrate reverse or neutral states.

As illustrated by FIG. 4, the speed ratios of the ten-speed transmission are selected by engagement of four clutches. A legal shift between gears includes one off-going clutch, one on-coming clutch, and three holding clutches. For example, to shift from Gear 4 to Gear 5, the clutch C4 is the off-going clutch, the clutch C5 is the on-coming clutch, and the clutches C1, C3, and C6 are all holding clutches.

Figure 5:
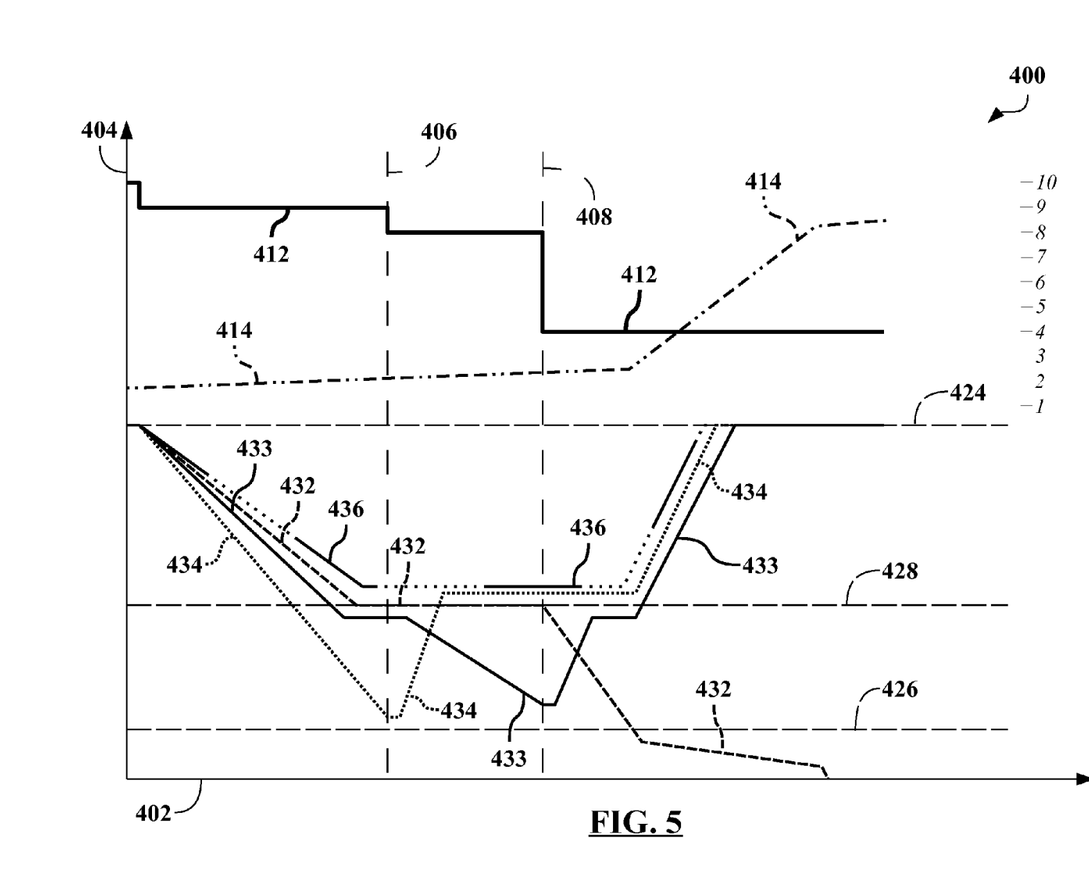
FIG. 5 is a schematic chart illustrating a shift maneuver for the transmission shown and described in FIG. 5.

Referring now to FIG. 5, and with continued reference to FIGS. 1-4, there is shown a schematic chart 400 illustrating a shift maneuver transitioning through a downshift of the ten-speed transmission with multiple changes of mind. The chart 400 is similar to the chart 200 of FIG. 3A and the chart 250 of FIG. 3B as applied to the nine-speed transmission described in table 100. However, the chart 400 applies to the ten-speed transmission described in table 300.

The chart 400 includes an x-axis 402, which illustrates time from left to right, and a y-axis 404, which represents different values depending upon the individual characteristics being shown. A marker 406 is used to help identify the general location or time of a first change-of-mind event occurring during the maneuver, and a marker 408 is used to help identify the general location or time of a second change-of-mind event occurring during the maneuver.

A commanded gear 412 shows the gear sought by the ten-speed transmission. The commanded gear 412 shows the mode (i.e., specific speed ratio) in which the controller is commanding operation. Illustrative mode numbers are shown along the upper right side of the chart 400. For example, when the driver requests significantly more acceleration by further depressing the accelerator pedal, it may be an indication that the ten-speed transmission should downshift into a lower gear to better accelerate the vehicle.

During the maneuver illustrated in chart 400, the current or initial shift is intended to change the ten-speed transmission from a starting gear, which is Gear 10, to an initial target gear, which is Gear 9. However, before completing that power downshift, the controller changes to a first adjusted shift, which is a downshift from the starting gear to an adjusted target gear, Gear 8.

The change from the initial shift to the adjusted shift generally occurs at the marker 406. At the marker 408 the controller again changes to a second adjusted shift, which is a downshift from the starting gear to a second adjusted target gear, Gear 4.

The chart 400 also includes an input speed 414, which is positive in the upward direction of the y-axis 404. As the ten-speed transmission executes downshifts, the input speed 414 generally increases to maintain smooth output speeds (not shown). Note that significant changes to the input speed 414 generally coincide with speed ratio changes in the ten-speed transmission.

The chart 400 schematically illustrates several pressure levels at which changes in torque-transmitting capability of the clutches within the ten-speed transmission occur. A max level 424 illustrates the fluid pressure at which engaged clutches may be held to maintain engagement. A slipping level 426 illustrates the pressure below which engaged clutches begin slipping, such that they are no longer transferring complete torque. A staging level 428 schematically illustrates a fluid pressure above the slipping level, such that clutches at the staging level 428 are engaged but are relatively close to slipping. Note that the pressure levels are illustrative only and that the chart 400 illustrates pressure of the staged clutches at or near the staging level 428.

The chart 400 illustrates the pressure of some of the specific clutches involved with the initial shift, the first adjusted shift, and the second adjusted shift. A C2 pressure 432 illustrates the pressure of the second clutch C2; a C3 pressure 433 illustrates the pressure of the third clutch C3; a C4 pressure 434 illustrates the pressure of the fourth clutch C4; and a C6 pressure 436 illustrates the pressure of the sixth clutch C6.

As the initial shift (10-9 PD) begins, the off-going clutch is the fourth clutch C4. Therefore, the C4 pressure 434 begins decreasing from the max level 424 toward the slipping level 426. The second clutch C2, the third clutch C3, and the sixth clutch C6 are all holding clutches.

Additionally, each of the holding clutches is also a jump-stage eligible holding clutch, because each of the holding clutches may be used as the off-going clutch for a legal downshift from the initial gear to another gear, as shown in table 300. Therefore, the C2 pressure 432, the C3 pressure 433, and the C6 pressure 436 begin decreasing toward, and generally pause at, the staging level 428.

The controller initiates the first adjusted shift at the marker 406 by changing the commanded gear 412 from Gear 9 to Gear 8. The fourth clutch C4 is no longer the off-going clutch for the first adjusted shift. However, the fourth clutch C4 is now a jump-stage eligible holding clutch, such that the C4 pressure 434 increases from the slipping level 426 toward the staging level 428.

The second clutch C2 and the sixth clutch C6 both remain jump-stage eligible for the first adjusted shift. Therefore, the C2 pressure 432 and the C6 pressure 436 maintain at the staging level 428.

The third clutch C3 becomes the off-going clutch for the first adjusted shift, such that the C3 pressure 433 decreases from the staging level 428 toward the slipping level 426. Once the C3 pressure 433 reaches the slipping level, the speed ratio change for the first adjusted shift (10-8 PD_JD) may begin. Note that the C3 pressure 433 is nearer the slipping level 426 because the third clutch C3 was jump-stage eligible during the initial shift and was, therefore, staged.

Prior to beginning slipping disengagement of the third clutch C3, the controller commands a second adjusted shift (10-4 PD_JD), as shown by the commanded gear 412 at the marker 408. The third clutch C3 is no longer the off-going clutch for the target gear. However, the third clutch C3 is jump-stage eligible, such that the C3 pressure 433 begins moving away from the slipping level 426 toward the staging level 428.

For the second adjusted shift, the fourth clutch C4 and the sixth clutch C6 remain jump-stage eligible, such that the C4 pressure 434 and the C6 pressure 436 are maintained at the staging level 428. Note that during each of the shift maneuvers illustrated in the chart 400, jump-stage eligible holding clutches are staged until the actual speed ratio change, which generally corresponds with the off-going clutch beginning to slip. Therefore, the pressure controls for the holding clutches are tied only to jump-stage eligibility and shift timing, which may be time based (a clock timer) or event based (slipping of the off-going clutch).

The new off-going clutch for the second adjusted shift is the second clutch C2. Therefore, the C2 pressure 432 begins decreasing from the staging level 428 toward the slipping level 426. As the C2 pressure 432 reaches the slipping level 426, the speed ratio change for the second adjusted shift (10-4 PD_JD) begins as the second clutch C2 disengages and the on-coming clutch (the first clutch C1, the pressure of which is not shown) engages.

Once the speed ratio change begins, as illustrated by the slope change of the input speed 414, the jump-stage eligible holding clutches may no longer be used for a power jump downshift. Therefore, the C3 pressure 433, the C4 pressure 434, and the C6 pressure 436 all move away from the staging level 428 and return to the max level 424.

The pressure commands shown in the chart 400 take generally sloped paths between the different torque-carrying levels. However, the commanded pressure may alternatively be immediately changed, such that the charts would show vertical lines, and the actual pressures would follow in a less-abrupt fashion. Alternatively, the pressure commands for the clutches may be changed in a decayed fashion, such that abrupt initial changes are followed by smoothing, asymptotic transitions to the final value (the staging level, for example).

The staging level for each of jump-stage eligible clutches may be individually determined based from a look-up table or an algorithm. Each jump-stage eligible clutch may have preset or calibrated staging levels, which may vary based on the specific legal jump downshifts available. Importantly, the staging levels implemented must be greater than the slipping level for that clutch.

An illustrative staging algorithm, which may be utilized by the transmissions and control schemes described herein, is shown below.

$$[Gx_{Cl}(T_{Cl})+Ofst_{Cl}]Adp+CP\_RS$$

In the staging algorithm, $Gx_{Cl}$ is the clutch gain; $T_{Cl}$ is the clutch torque; $Ofst_{Cl}$ is the clutch offset; Adp is the shift adapt; and CP_RS is the clutch learned return spring value.

The clutch gain and the clutch offset are calibratable values that are gearbox specific. Clutch torque is calculated as the product of lever ratio and input torque. Where there are both estimated and actual input torque values, the larger may be used by the controller 20 in determining the staging pressures. Since each jump-stage eligible clutch could potentially be the off-going clutch for more than one shift from the current attained gear, the shift adapt chosen is for the most likely shift possible.

Figure 6:
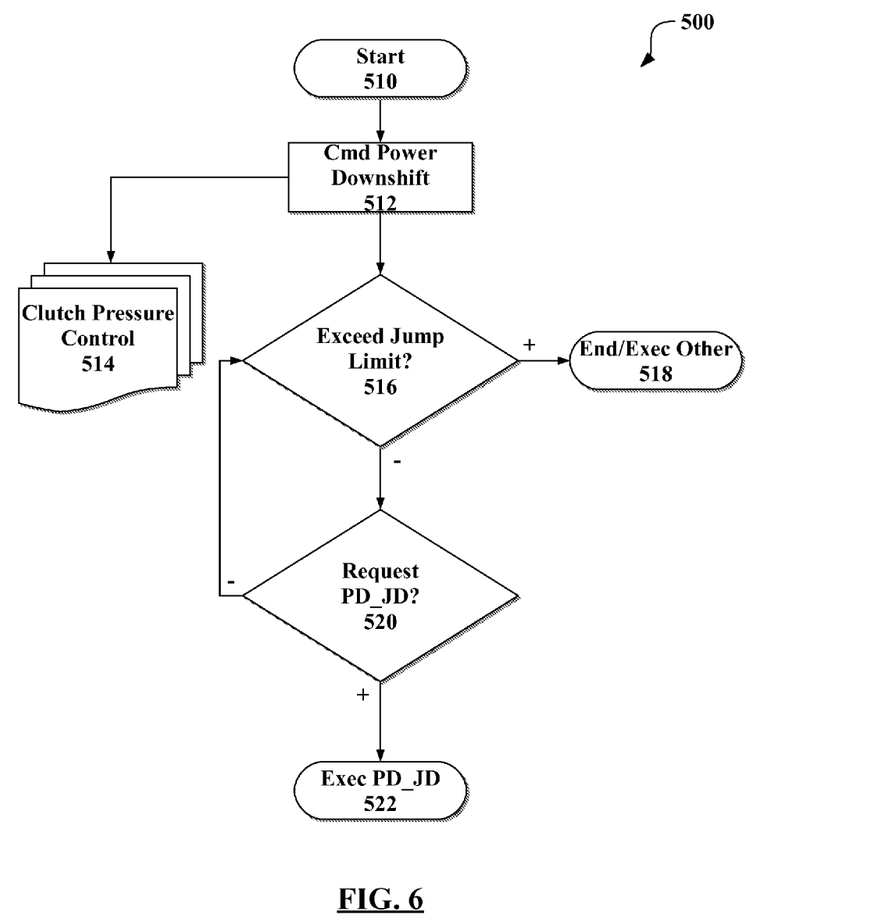
FIG. 6 is a schematic flow chart diagram of an algorithm or method for controlling shifts in multi-speed transmissions, such as those shown and described in FIGS. 1, 2, and 4.
Figure 7:
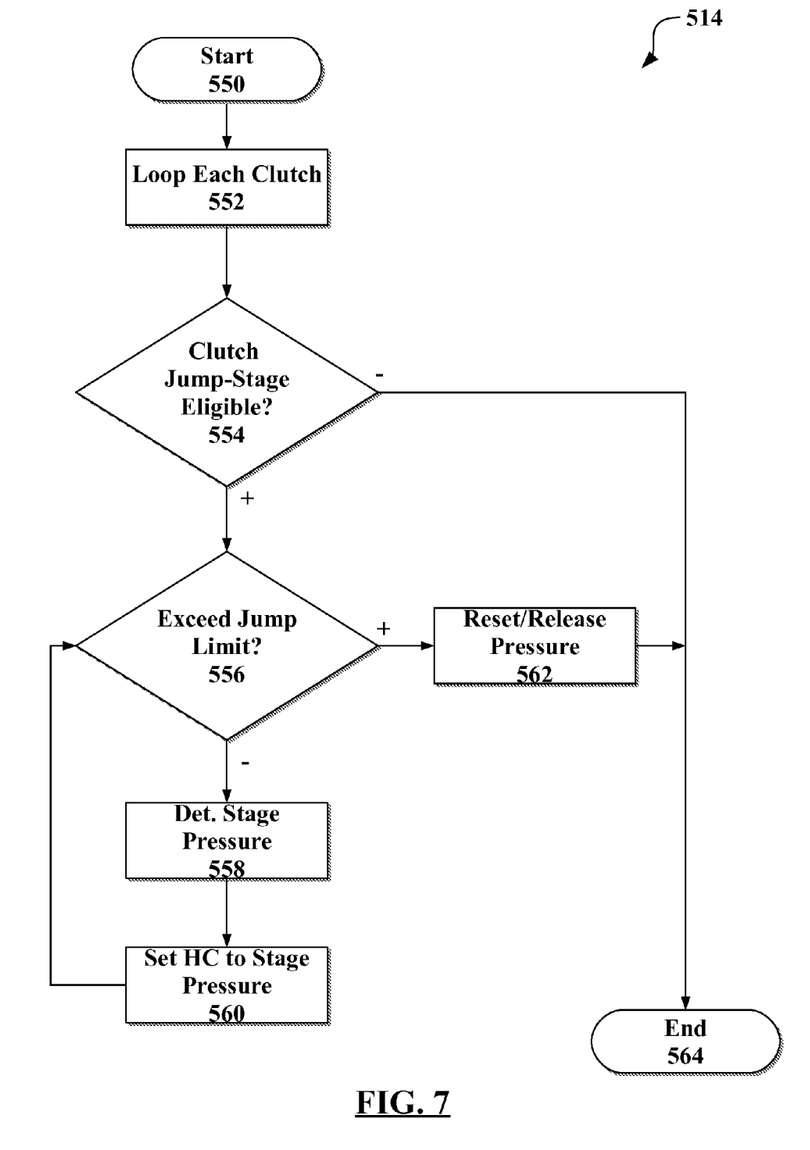
FIG. 7 is a subroutine of the flow chart diagram of FIG. 6, which illustrates pressure control over clutches of the multi-speed transmission.

Referring now to FIGS. 6 and 7 there is shown a schematic flow chart diagram of an algorithm or method 500 for controlling a transmission, such as the transmission 14 shown in FIG. 1. FIGS. 6 and 7 show only a high-level diagram of the method 500, portions of which are shown in both FIG. 6 and FIG. 7. The exact order of the steps of the algorithm or method 500 shown in FIG. 4 is not required. Steps may be reordered, steps may be omitted, and additional steps may be included. Furthermore, the method 500 may be a portion or sub-routine of another algorithm or method.

For illustrative purposes, the method 500 may be described with reference to the elements and components shown and described in relation to the other figures and may be executed by the transmission 14 or the controller 20 associated therewith. However, other components may be used to practice the method 500 and the systems defined in the appended claims. Any of the steps may be executed by multiple controls or control system components.

Step 510: Start.

The method 500 may begin at a start or initialization step, during which time the method 500 is made active and may be monitoring operating conditions of the vehicle, the powertrain 10, and the transmission 14. Initiation may occur, for example, in response to the vehicle operator inserting the ignition key or in response to specific conditions being met, such as whenever the controller 20 requests a shift for the transmission 14. The method 500 may be running constantly or looping constantly whenever the vehicle is in use.

Step 512: Command Power Downshift.

The method 500 monitors for, or includes, commanding a power downshift of the transmission 14. The controller 20 may be monitoring, for example, the commanded gear for the transmission 14. Alternatively, commanding the power downshift may be considered the initiator for the method 500, such that it occurs in the start step 510.

Step 514: Clutch Pressure Control Sub-Routine.

Once the method 500 initiates and a power downshift is commanded, the controller 20 begins executing a routine for pressure control over each of the clutches in the gearbox. This routine may be considered separate from the remainder of the method 500 and is described separately, even though some of the considerations are common between the sub-routine 514 and the remainder of the method 500.

Step 516: Exceed Time or Event-Based Jump Limit?

The method 500 determines whether the current power downshift has exceeded the jump downshift limit, which may be time-based, event-based, or a combination thereof. As discussed with reference to the shift maneuvers illustrated in FIGS. 3A, 3B, and 5, one event-based jump limit may be slipping of the off-going clutch. Another event-based jump limit is initiation of the speed ratio change.

A time-based jump limit may include a jump timer, which is a clock beginning substantially simultaneously with the beginning of the commanded power downshift. Importantly, the jump timer may be reset at the beginning of each new or adjusted shift, such as the first adjusted shift and the second adjusted shift illustrated in the chart 400. Therefore, even though a total shift time, as measured from the beginning of the initial shift, has increased beyond the jump limit, the jump downshift may still be available because an adjusted shift has yet to begin.

The duration of the jump timer may be variable and may be calibrated based on the type of shift and the states of the clutches involved. The jump timer may generally correspond to an estimate of the amount of time needed for the off-going clutch to begin slipping disengagement, such that the jump timer is a time-based estimate of the event-based jump limits. Therefore, the method 500 may include estimating a current off-going slip time, and determining the jump timer therefrom. Where a new, or adjusted, shift is commanded before the time-based or event-based jump limit is reached, the method 500 may either reset the jump limit or may consider the jump limit to have been reached.

Step 518: End/Execute Other Shift.

If step 516 determines that the jump limit has lapsed, the method 500 proceeds to an end step. The end step may also be a loop back to the start, if conditions for re-initiating the method 500 are met. If the jump limit is exceeded by, for example, slipping of the off-going clutch for the initial shift, the end step may include execution of the initial shift. If the jump limit is exceeded by, for example, a change-of-mind to an upshift, the end step may include aborting the power downshift and executing the upshift.

Step 520: Request Jump Power Downshift?

If step 516 determines that the jump limit has not been exceeded, the method 500 proceeds to determining whether the jump downshift has been commanded or requested. The request may be signaled by, for example, the controller 20 decreasing the commanded gear from the current target gear to a lower adjusted target gear that is available via a legal downshift from the current gear. If the PD_JD has not been requested, the method 500 may continue to look through determining whether the jump limit has been exceeded and whether the jump power downshift has been requested.

Step 522: End/Execute Jump Power Downshift.

Ending the method 500 may include executing the jump power downshift by switching control over the clutches to begin execution. Note that the jump power downshift is a downshift that triggers the method 500 to begin again, such that the end step may also be considered a loop step.

Alternatively, the method 500 may be looping or running continuously until the transition conditions are met. The method 500 may be part of a larger transmission control system and may be a sub-process of other shift-control algorithms.

Step 550: Start Pressure Control Sub-Routine.

The pressure control sub-routine 514 of the method 500 may include multiple steps. The sub-routine 514 is triggered when the controller 20 commands a power downshift.

Step 552: Run or Loop Sub-Routine for Each Clutch.

Whether incorporated into the start step 550 or an individual step, as shown in FIG. 7, the sub-routine 514 runs on each clutch in the gearbox. For example, the sub-routine 514 would run on at least C1-C6 of the transmission 14, as those are the clutches involved with forward speeds.

Step 554: Determine Whether Clutch is Jump-Stage Eligible?

The sub-routine 514 determines whether each clutch is jump-stage eligible. In order to be jump-stage eligible, the clutch must be a holding clutch for the current shift and must be an off-going clutch for a legal shift from in the initial target gear.

For example, as shown by the table 300, the second clutch C2 is a holding clutch for the initial shift maneuver from Gear 10 to Gear 9. The second clutch C2 is also an off-going clutch for a legal downshift from the current gear, Gear 10, to either of two adjusted target gears, Gear 7 or Gear 4.

Step 556: Exceed Time-Based or Event-Based Jump Limit?

The sub-routine 514 also includes determining whether jump limit has been exceeded. This determination may be substantially identical to the determination of step 516 in the method 500, and the two routines may share the same output or signal regarding the time-based or event-based jump limit.

Step 558: Determine Staging Pressure.

The sub-routine 514 then determines the staging pressure for each jump-stage eligible clutch subject to the sub-routine 514. As discussed above, the controller 20 may determine the staging pressure based upon, for example, a look-up table or an algorithm.

Step 560: Set Holding Clutch to Staging Pressure.

After determining the staging pressure needed to prepare the jump-stage eligible clutch to quickly become an off-going clutch, the sub-routine sets the holding clutch to the staging pressure. Therefore, the holding clutch is commanded to the staging pressure and actual pressure of the holding clutch will generally match the commanded level.

After setting the holding clutch to the staging pressure, the sub-routine 514 loops back to verify that the current shift has not exceeded the jump limit. Furthermore, changing conditions may alter the staging pressure determined in step 558.

Step 562: Reset or Release Pressure Controls.

When the step 556 determines that the current shift has exceeded the jump limit, the sub-routine 514 resets or releases the staging control over the jump-stage eligible holding clutches. This hands over control of the jump-stage eligible clutches for actual execution of the jump power downshift or a different shift.

Step 564: End.

After the staging controls are released, or for clutches that are not jump-stage eligible, the sub-routine 514 ends until the method 500 calls on the sub-routine 514 in response to commanding a power downshift. Note that, where an adjusted shift triggers the jump limit but is also a downshift, the method 500 may immediately call the sub-routine 514 to begin staging any jump-stage eligible holding clutches until the adjusted shift begins its speed ratio change.

The detailed description and the drawings or figures are supportive and descriptive of the subject matter discussed herein. While some of the best modes and other embodiments for have been described in detail, various alternative designs, configurations, and embodiments exist.

The invention claimed is:

1. A method of controlling clutches in a multi-speed transmission, comprising:
   beginning a current shift, wherein the current shift changes the transmission from a starting gear to an initial target gear;
   determining whether the current shift is a downshift, such that the initial target gear has a higher speed ratio than the starting gear;
   determining jump-stage eligibility of a first clutch, including:
      determining whether the first clutch is a holding clutch for the current shift; and
      determining whether the first clutch is an off-going clutch for a legal shift from the starting gear to an adjusted target gear, which has a higher speed ratio than the starting gear;
   if the first clutch is not jump-stage eligible, maintaining pressure of the first clutch at a current pressure; and
   if the first clutch is jump-stage eligible, reducing the pressure of the first clutch from the current pressure to a staging pressure, wherein the staging pressure is greater than a slipping pressure.

2. The method of claim 1, wherein determining jump-stage eligibility of the first clutch further includes:
   determining whether the current shift has exceeded a jump limit, wherein the jump limit corresponds to a clock timer.

3. The method of claim 1, wherein determining jump-stage eligibility of the first clutch further includes:
   determining whether the current shift has exceeded a jump limit, wherein the jump limit corresponds to slipping of an off-going clutch for the current shift to the initial target gear.

4. The method of claim 1, wherein determining whether the first clutch is an off-going clutch for a legal shift from the starting gear to the adjusted target gear includes:
   determining whether there is only one on-coming clutch between the adjusted target gear and the starting gear; and
   determining whether the first clutch is the only off-going clutch between the adjusted target gear and the starting gear.

5. The method of claim 1, further comprising:
   executing an adjusted shift from the starting gear to the adjusted target gear, wherein executing the adjusted shift includes reducing pressure of the first clutch to below the slipping pressure.

6. The method of claim 1, further comprising:
   determining the staging pressure for the first clutch from one of a physics-based algorithm and a look-up table.

7. The method of claim 1, further comprising:
   determining jump-stage eligibility of a second clutch, including:
      determining whether the second clutch is a holding clutch for the current shift; and
      determining whether the second clutch is an off-going clutch for a legal shift from the starting gear to an adjusted target gear, which has a higher speed ratio than the starting gear;
   if the second clutch is not jump-stage eligible, maintaining pressure of the second clutch at a current pressure; and
   if the second clutch is jump-stage eligible, reducing the pressure of the second clutch from the current pressure to a staging pressure for the second clutch, wherein the staging pressure is greater than a slipping pressure for the second clutch.

8. A method of controlling clutches in a multi-speed transmission, comprising:
   beginning a current shift, wherein the current shift changes the transmission from a starting gear to an initial target gear;
   determining whether the current shift is a downshift, such that the initial target gear has a higher speed ratio than the starting gear;
   determining jump-stage eligibility of a first clutch, including:
      determining whether the first clutch is a holding clutch for the current shift;
      determining whether the first clutch is an off-going clutch for a legal shift from the starting gear to an adjusted target gear, which has a higher speed ratio than the starting gear; and
      determining whether the current shift has exceeded a jump limit;

if the first clutch is not jump-stage eligible, maintaining pressure of the first clutch at a current pressure; and if the first clutch is jump-stage eligible, reducing the pressure of the first clutch from the current pressure to a staging pressure, wherein the staging pressure is greater than a slipping pressure for the first clutch.

9. The method of claim 8, further comprising:

determining the staging pressure for the first clutch from one of a physics-based algorithm and a look-up table.

10. The method of claim 9, wherein determining whether the first clutch is an off-going clutch for a legal shift from the starting gear to the adjusted target gear includes:

determining whether there is only one on-coming clutch between the adjusted target gear and the starting gear; and determining whether the first clutch is the only off-going clutch between the adjusted target gear and the starting gear.

11. The method of claim 10, wherein the jump limit corresponds to a clock timer.

12. The method of claim 10, wherein the jump limit corresponds to slipping of an off-going clutch for the current shift to the initial target gear.

13. The method of claim 12, further comprising:

determining jump-stage eligibility of a second clutch, including:

determining whether the second clutch is a holding clutch for the current shift; and determining whether the second clutch is an off-going clutch for a legal shift from the starting gear to an adjusted target gear, which has a higher speed ratio than the starting gear;

if the second clutch is not jump-stage eligible, maintaining pressure of the second clutch at a current pressure; and if the second clutch is jump-stage eligible, reducing the pressure of the second clutch from the current pressure to a staging pressure for the second clutch, wherein the staging pressure is greater than a slipping pressure for the second clutch.

\* \* \* \* \*